Patented Nov. 19, 1940

2,222,332

UNITED STATES PATENT OFFICE 2,222,332

TREATMENT OF SYLVINITE ORE

Arthur J. Weinig, Golden, Colo., assignor to Potash Company of America, Denver, Colo., a corporation of Colorado No Drawing. Application April 15, 1938, Serial No. 202,208

11 Claims. (Cl. 209—166)

This invention relates to a froth flotation process for the separation of the valuable constituents of sylvinite ores.

Sylvinite ore consists mainly of sodium chloride and potassium chloride crystals, together with minor inclusions of other mineral matter, such as iron and manganese oxides, clays, polyhalite and the like.

The invention relates particularly to the separation of the various salts of the ore to the end that potassium chloride may be recovered as a substantially pure product and it is an object of the invention to provide a simple and inexpensive treatment by which various constituents other than potassium chloride solids are selectively floated in a froth leaving the non-floated solids of the treatment as a purified potassium chloride product.

In such a flotation treatment the pulp-forming step includes the introduction of finely-divided particles of sylvinite ore into a saturated solution of the ore to prevent dissolution of the mineral particles. Such a pulp-producing operation has been disclosed in Anderson Patent No. 2,046,312.

In practicing the present invention the pulp formation operation differs from the treatment of the Anderson patent in the inclusion in the solution of the pulp of a catalyst capable of promoting a flotation reaction for sodium chloride. To this end metallic lead or lead salts are entered into solution in the liquid phase of the pulp, which feature is described and claimed in my co-pending application Serial No. 173,431, filed November 8, 1937 for Flotation process, and the liquid phase differs from the saturated solution of the Anderson treatment as a consequence.

Another object of the pesent invention is to provide a class of flotation reagents for use in a froth flotation separation of the valuable constituents of sylvinite ores, which require but little dilution with water to be effective, and thereby improve the degree of washing allowable on the concentrate of such a treatment by permitting use of additional quantities of liquid for this purpose when the liquid phase of the treatment is recirculated through the process.

The class of reagents referred to consists of organic acids classed as alicyclic carboxylic acids involving ring structures and which correspond empirically to the formula $C_nH_{2n-1}COOH$, the entire range of compositions in this class being effective for the purposes of the present invention. The salts of these acids also are generally effective. These compounds can be made synthetically in many ways and are extensively produced in the petroleum industry. Examples of the naphthenic acid group suitable for the purposes of the present invention are described hereinafter.

Various derivatives of the naphthenic acids are also suited for use as reagents in the present treatment and examples of such derivatives are the alkali naphthenates and more particularly sodium and/or potassium naphthenates, the ammonium naphthenates and more particularly ammonium naphthenate, and organic base naphthenates and more particularly triethanalomine naphthenate.

For convenience in description, the entire class of such acids and salts will be designated by the formula $C_nH_{2n-1}COO$—R, in which R may be hydrogen or a base, either organic or inorganic.

When reagents of the aforesaid classifications are used in the pulp of the present invention they exert a selective affinity for the sodium chloride solids and the insolubles such as polyhalite and the gangues, with the result that such constituents collect in a froth leaving the residual solids as a purified potassium chloride product which may be separately removed.

These reagents produce frothing, collection, promotion and selection in a froth flotation treatment of sylvinite ores in which lead is dissolved.

In addition to their use as the sole flotation reagent of the treatment the naphthenic acids and derivatives may also be used effectively with the fatty acid and alkali resinate reagents described in my aforesaid application Serial No. 173,431, and more particularly with oleic acid, palm kernel soap, coconut oil soap, and the alkali resinates described in my Patent No. 2,105,295, and with the aforesaid reagents in combination with cresylic acid, as described in my co-pending application Serial No. 123,484, or with cresylic acid alone.

When used in the mixtures aforesaid the naphthenic acids and derivatives are effective in reducing the quantity of a given reagent composition as well as providing the carrier liquid for such reagent which eliminates the need for preparation of water solutions. Thus the efficiency of the process is improved due to increased selectivity with a consequent saving in time and expense in the operations required to complete the separation, thereby increasing capacity of a plant of a given size.

In performing the process the ore is prepared for treatment in the usual way by grinding or otherwise reducing the same to a finely-divided condition. While each operation will involve some variation in treatment based upon variable characteristics of the ore and other factors, grinding to −48 mesh may be taken as a standard.

The ground ore is entered into a solution saturated with respect to both sodium chloride and potassium chloride and preferably a saturated solution of the ore, and prior to commencement of the flotation action the lead, which serves as the catalyst, must be present in such saturated solution.

Any of the well-known methods of dry or wet grinding may be employed, and in practice it has been found that good results will be effected by wet grinding in a pebble mill in closed circuit with a classifier. In such an operation it is preferable to enter the catalyst into solution in the grinding circuit, although it may be otherwise introduced where desired, and from 1 to 2 grams of lead per liter in the solution is recommended for best results.

The pulp so formed is entered into suitable froth flotation apparatus and subjected to a flotation treatment in the presence of any of the aforesaid reagents or reagent mixtures which may be mixed initially with the pulp before being subjected to the agitation and aeration of the flotation treatment, or where more convenient, the reagent may be introduced into the flotation cell separately from the pulp and mixed therewith by the agitative action of the process.

In the treatment the sodium chloride and gangue constituents in suspension separate from the potassium chloride content and collect in a froth which is discharged from the tank by overflow or in any other suitable manner, while the purified potassium chloride solids are collected as a non-floated concentrate and separately removed.

While I do not wish to be limited to any exact proportions in the use of the substances comprising the reagent, satisfactory results have been obtained by the use of from ¼ to 1 pound of naphthenic acid or its equivalent in its salts per ton of ore. The detergent powers of the naphthenic acid reagents are very low while the brine solubility of these compositions is much higher than any of the soaps heretofore used, for which reason they are much more difficult to salt out than the soaps.

To afford a better understanding of the operating procedure certain test operations will now be cited. In these tests, sylvinite ore from the Carlsbad, New Mexico field were subjected to treatment. On analysis this ore was shown to contain 46% potassium chloride.

The general procedure for these tests involved the introduction into a flotation machine of a pulp composed of one part by weight of such ore, ground to −48 mesh, and three parts by weight of a saturated solution of the sylvinite ore, containing two grams of lead per litre.

This pulp was then subjected to aeration and agitation during two five minute intervals in which the froth removed was separately weighed and analyzed. All tests were roughing tests and no recleaning of the products of these tests was undertaken. The reagent use is recorded in equivalent pounds per ton of sylvinite ore.

The results of these tests follows:

(A) NAPHTHENIC ACIDS (COMMERCIAL) REAGENT

Reagent use:
.54 lb. for the first froth
.28 lb. for the second froth

*Metallurgical results of test*

|  | Percent weight | Percent KCl | Percent NaCl | Percent insol. |
|---|---|---|---|---|
| First froth | 41.2 | 9.95 | 87.7 | 2.29 |
| Second froth | 18.5 | 34.90 | 63.4 | 1.68 |
| Unfloated residue | 40.3 | 91.50 | 8.3 | .16 |
|  | 100.0 |  |  |  |

(B) SODIUM NAPHTHENATE

Reagent use:
.30 lb. sodium naphthenate for first froth
.20 lb. sodium naphthenate for second froth

*Metallurgical results of test*

|  | Percent weight | Percent KCl | Percent NaCl | Percent insol. |
|---|---|---|---|---|
| First froth | 36.8 | 7.1 | 90.7 | 2.24 |
| Second froth | 14.3 | 19.8 | 78.7 | 1.46 |
| Unfloated residue | 48.9 | 87.0 | 12.5 | 0.46 |

(C) AMMONIUM NAPHTHENATE

Reagent use:
.40 lb. for first froth
.40 lb. for second froth

*Metallurgical results of test*

|  | Percent weight | Percent KCl | Percent NaCl | Percent insol. |
|---|---|---|---|---|
| First froth | 44.5 | 12.3 | 85.5 | 2.15 |
| Second froth | 18.8 | 40.5 | 58.0 | 1.41 |
| Unfloated residue | 36.7 | 92.4 | 6.9 | .73 |
|  | 100.0 |  |  |  |

(D) TRIETHANOLAMINE NAPHTHENATE

Reagent use:
.40 lb. of first froth
.60 lb. for second froth

*Metallurgical results of test*

|  | Percent weight | Percent KCl | Percent NaCl | Percent insol. |
|---|---|---|---|---|
| First froth | 33.8 | 4.9 | 92.3 | 2.76 |
| Second froth | 24.0 | 28.9 | 69.7 | 1.37 |
| Unfloated residue | 42.2 | 89.6 | 9.9 | 0.45 |
|  | 100.0 |  |  |  |

While the foregoing tests disclose an efficient separation, the final grade and recovery may be improved appreciably by treatment of both froth and residue products of the initial separation, preferably by temperature variation methods of the type described and claimed in my Patent No. 2,105,294.

For example, an identical test was made by flotation as shown in Test (A), in which a measured excess volume of solution was taken at the start of test. The two froths, however, were agitated with the remainder of the solution not used in the flotation operation, and heated to 40° C. The warm pulp was then settled and filtered. The warm solution thus recovered was added to the unfloated residue pulp and the resulting pulp was then cooled down to 20° C. with agitation. After this, the cooled pulp was settled and filtered. Following these operations, the filter cakes of sodium chloride and potassium chloride were washed with saturated aqueous solution of sodium chloride and potassium chloride, respectively, in volume amounts which when these wash filtrates were added to the cooled filtrate from the potassium chloride pulp, restored the volume of the original quantity of solution used at the start of the test.

This gave the following metallurgical result:

|  | Percent weight | Percent KCl | Percent recovery |
|---|---|---|---|
| Sodium chloride and gangue reject | 54.0 | 0.6 | |
| KCl product | 46.0 | 99.0 | 99.4 |

Many advantages result from treatment according to the present invention. The reagents are very cheap compared with the costs of other reagents referred to hereinbefore and an abundant supply exists in American petroleum insuring adequate supply in the event of national emergency.

Further, when used in plants where pure water is not available, the present reagents eliminate the necessity of any considerable shipment of pure water to such plants, as naphthenic acids and their salts require either no water at all, or very little water for dilution, when they are introduced as flotation reagents.

The increased capacity previously mentioned results from the fact that the flotation treatment is shortened by reason of the greater selectivity of the reagent, and the treatments subsequent to flotation are likewise shortened and improved due in part to the absence of water ordinarily used for soap dilution, which in the present instance permits addition of extra wash liquid without producing an increasing volume of mill solution.

In a treatment of this character, it is highly desirable to recirculate the saturated solution to avoid wasting the valuable constituents in solution, and to avoid the expense and loss of time incident to the production of such a solution. When the reagents of such a treatment have to be diluted, the amount of water added with the reagent must be compensated for by withdrawal of an equivalent quantity of saturated solution. Therefore, the present process provides an improvement in operating procedure due to the small amount of water required for reagent dilution, in that a greater volume of liquid can be employed in washing the separated salts to improve grade and recovery, without thereby increasing the volume of the recirculating solution.

In introducing the lead into the solution, as previously described, metallic lead may be used and introduced into the grinding circuit, or if preferred, lead salts may be used and introduced either into the grinding circuit or elsewhere as preferred. Examples of such salts are lead acetate, lead nitrate, lead sulfate, lead carbonate, lead chloride, and lead oxide. The lead is not dissipated in the flotation reaction and an occasional addition to compensate for mechanical losses is all that is required as has been explained in my aforementioned Patent No. 2,105,295.

While the various steps and treatments hereinbefore described disclose what in practice has given highly efficient results in the separation of valuable constituents of sylvinite ores, it will be apparent that changes in the operating procedure and in the various steps and treatments may be availed of without departing from the spirit of the invention as herein set forth, and it will be understood that the various phases of the operating procedure are cited merely for the purpose of illustrating the invention and not for the purpose of defining the limits thereof, reference being had to the appended claims for this purpose.

What I claim and desire to secure by Letters Patent is:

1. The process of treating sylvinite ores, which comprises introducing sylvinite ore in finely divided condition into a saturated solution of the ore containing lead dissolved therein to form a pulp, and froth floating sodium chloride and gangue constituents of the pulp by the action of naphthenic acid or a salt thereof.

2. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of an alkali naphthenate.

3. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of sodium naphthenate.

4. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of ammonium naphthenate.

5. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of an organic base naphthenate.

6. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of triethanolamine naphthenate.

7. The process of treating sylvinite ores, which comprises introducing sylvcinite ore in finely divided condition into a saturated solution of the ore containing lead dissolved therein to form a pulp, and froth floating sodium chloride and gangue constituents of the pulp from the potassium chloride present by the action of a mixture of naphthenic acid or a salt thereof and a salt water soap.

8. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of a mixture of naphthenic acid or a salt thereof and an alkali resinate.

9. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of a mixture of naphthenic acid or a salt thereof and cresylic acid.

10. In a process for treating sylvinite ores in a saturated solution of the ore in a cyclic operation, involving a froth flotation separation of the sodium and potassium salts of such ore, followed by separation of the liquid and solid phases of the products of such flotation separation, washing of the solids so separated, and the return of the liquid phases so separated to the flotation stage, the improvement which comprises the use of naphthenic acid or a salt thereof as reagents in the froth flotation separation, in the presence of lead or a salt thereof thereby increasing the volume of liquid usable in the washing operation without increasing the volume of such recirculated solution.

11. The process of treating sylvinite ores, which comprises introducing sylvinite ore in finely divided condition into a saturated solution of the ore containing lead dissolved therein to form a pulp, and froth floating sodium chloride and gangue constituents of the pulp from the potassium chloride present by the action of a salt of naphthenic acid.

ARTHUR J. WEINIG.